US007832286B2

(12) United States Patent
Nakagawa et al.

(10) Patent No.: US 7,832,286 B2
(45) Date of Patent: Nov. 16, 2010

(54) TORQUE WRENCH

(75) Inventors: Takamichi Nakagawa, Hirakata (JP); Shogo Nakata, Kyoto (JP); Masahiko Umekawa, Kashiba (JP); Tadashi Hanai, Iga (JP); Kouji Fujita, Yao (JP)

(73) Assignees: Kyoto Tool Co., Ltd., Kyoto-shi (JP); Hosiden Corporation, Yao-shi (JP)

(*) Notice: Subject to any disclaimer, the term of this patent is extended or adjusted under 35 U.S.C. 154(b) by 0 days.

(21) Appl. No.: 11/327,495

(22) Filed: Jan. 9, 2006

(65) Prior Publication Data

US 2006/0225519 A1 Oct. 12, 2006

(30) Foreign Application Priority Data

Apr. 7, 2005 (JP) ............................ 2005-111035

(51) Int. Cl.
*G01L 5/24* (2006.01)

(52) U.S. Cl. .................................................. 73/862.22

(58) Field of Classification Search ............. 73/862.22, 73/862.21, 862.23, 862.26
See application file for complete search history.

(56) References Cited

U.S. PATENT DOCUMENTS

| | | | | |
|---|---|---|---|---|
| 2,795,131 | A * | 6/1957 | Booth | 73/862.21 |
| 3,270,594 | A * | 9/1966 | Grabovac | 81/483 |
| 3,274,827 | A * | 9/1966 | Sturtevant | 73/862.23 |
| 4,558,601 | A * | 12/1985 | Stasiek et al. | 73/862.23 |
| 4,602,538 | A * | 7/1986 | Neuhaus | 81/467 |
| 4,608,872 | A * | 9/1986 | Mayer et al. | 73/862.23 |
| 4,665,756 | A * | 5/1987 | Snyder | 73/862.21 |
| 4,982,612 | A * | 1/1991 | Rittmann | 73/862.23 |
| 6,698,298 | B2 * | 3/2004 | Tsuji et al. | 73/862.21 |
| 6,784,799 | B2 * | 8/2004 | Hsien | 340/668 |
| 6,940,417 | B2 * | 9/2005 | Hsien | 340/668 |
| 7,036,407 | B2 * | 5/2006 | Pyre et al. | 81/467 |
| 7,089,834 | B2 * | 8/2006 | Reynertson et al. | 81/479 |

FOREIGN PATENT DOCUMENTS

DE 20108689 U1 8/2001

(Continued)

OTHER PUBLICATIONS

Japanese Office Action dated Jul. 7, 2007 (in Japanese).
European Search Report dated Mar. 10, 2010.

*Primary Examiner*—Lisa M Caputo
*Assistant Examiner*—Octavia Davis
(74) *Attorney, Agent, or Firm*—Kratz, Quintos & Hanson, LLP

(57) ABSTRACT

The invention seek to enable to share main components other than a tightening unit even in use for different effective lengths corresponding to ranges of tightening torques. There are provided: a tightening unit 10 such as a ratchet; a housing 20 having a two-divided structure including a front side cover part 21 and a back side grip part 22; a strain body 30 provided inside the housing 20 and replaceably coupling the tightening unit 10 thereto; a distortion sensor 40, provided to the strain body 30, for detecting the distorted amount of the strain body 30 due to the tightening force of the tightening unit 10; a microprocessor chip 100 having functions including computing the tightening torque of the tightening unit 10 based on torque reference values prepared in advance and detection results of the distortion sensor 40; and an output unit 300 for outputting such as the tightening torque.

14 Claims, 6 Drawing Sheets

FOREIGN PATENT DOCUMENTS

| | | | |
|---|---|---|---|
| FR | 2841650 | A1 | 1/2004 |
| JP | 62-176777 | | 8/1987 |
| JP | 2001-260044 | | 9/2001 |
| JP | 2003-185515 | | 7/2003 |

* cited by examiner

TORQUE WRENCH

CROSS-REFERENCE TO RELATED APPLICATIONS

The present invention claims priority under 35 U.S.C. [section] 119 of Japanese Patent Application No. JP 2005-111035 filed on Apr. 7, 2005, the disclosure of which is expressly incorporated by reference herein in its entirety.

BACKGROUND OF THE INVENTION

1. Field of the Invention

The present invention relates to a torque wrench for measuring a tightening torque of a tightening tool such as a latchet by using a distortion sensor.

2. Description of the Related Art

In conventional torque wrenches, there is one in which a tightening tool such as a ratchet is fixed to the wrench main body, and a tightening torque is computed based on an output of a distortion sensor mounted on a handle part of the wrench main body, having a function that when the computation result reaches a tightening torque set value which has been set beforehand, an alarm or the like is generated, whereby an appropriate tightening torque can be obtained securely (see, for example, Japanese Patent Application Laid-open No. 62-176777).

However, in the case of the conventional example described above, a manufacturer is required to provide plural kinds of torque wrenches having different ranges of tightening torques, but if their effective lengths differ corresponding to the ranges of the tightening torques, main components such as a wrench body cannot be used in common. This causes a problem that it is difficult to reduce the production cost.

SUMMARY OF THE INVENTION

The present invention has been developed in view of the situation described above. The main object of the present invention is to provide torque wrenches in which main components other than tightening units can be used in common even though the effective lengths differ corresponding to ranges of tightening torques.

A torque wrench of the present invention comprises: a tightening unit; a strain body in which the tightening unit is connected with a tip part thereof replaceably; a distortion sensor for detecting a distorted amount of the strain body due to a tightening force of the tightening unit; a torque computation unit, in which a torque reference value required for computing a tightening torque of the tightening unit has been prepared in advance, for computing the tightening torque based on the torque reference value and a detection result of the distortion sensor; and an output unit for outputting at least a computation result of the torque computation unit as a tightening torque measurement value.

In a case of a mode in which the strain body is accommodated in a housing, the housing has a two-divided structure including: a front side cover part which is in a cylindrical shape accommodating a tip part of the strain body, and a tip face thereof has a hole into which the base end part of the tightening unit is inserted; and a back side grip part which is in a cylindrical shape accommodating the base end part of the strain body and has an axis, inside thereof, extending in a direction orthogonal to the tightening force of the tightening unit. The strain body is rotatably supported by the axis such that the back side grip part can tilt slightly with respect to the front side cover part.

In the mode described above, the torque wrench comprises: a tilt detector, provided inside the housing, for detecting whether the back side grip part is tilted at a predetermined angle with respect to the front side cover part by tightening operation; and an error monitoring unit for causing the output unit to output a measurement error based on the detection result of the tilt detector.

Further, it is desirable that the torque wrench comprises: a setting unit for setting a tightening torque set value; and a torque judgment unit for judging whether the torque measurement value shown by the computation result of the torque computation unit is close to or reaches the tightening torque set value set through the setting unit, and causing the output unit to output the judgment result.

Further, the housing is preferably provided with a lock mechanism for locking such that the back side grip part is capable of being unlocked without tilting with respect to the front side cover part. As an example of the lock mechanism, there is one which is so configured as to include a lock member provided rotatably to a back end part of the back side grip part, and the lock member has a long hole for regulating movement, into which the back end part of the strain body is inserted.

In a case of the torque wrench according to claim 1 of the present invention, when the effective lengths differ corresponding to ranges of tightening torques, it is possible to obtain accurate measurement results of tightening torques by changing the torque reference value corresponding to the effective value, basically. That is, it is possible to use main components other than the tightening unit for supplying various types of torque wrenches having different ranges of tightening torques. Therefore, the production cost can be suppressed.

In a case of the torque wrench according to claim 2 of the present invention, when performing tightening operation by holding the back side grip part of the housing by hand, the tightening force acts directly on the strain body only through the axis as long as the grip position is appropriate. That is, since the power point with respect to the strain body is one, it is possible to detect the tightening force with high accuracy by the distortion sensor, whereby the measurement accuracy of the tightening torque is improved.

In a case of the torque wrench according to claim 3 of the present invention, when performing tightening operation by holding the back side grip part of the housing, if the power point position is inappropriate whereby the back side grip part tilts largely with respect to the front side cover part and the inner face of the housing partially contacts the strain body so that a plurality of power points exist with respect to the strain body, a measurement error is set to be outputted. Therefore, even when an inexperienced person performs tightening operation, it is possible to obtain an accurate measurement result of the tightening torque.

In a case of the torque wrench according to claim 4 of the present invention, when the measured tightening torque is close to or reaches a tightening torque set value which has been set in advance, the fact is outputted. Therefore, it is possible to perform tightening operation smoothly.

In a case of the torque wrench according to claim 5 or 6 of the present invention, a lock mechanism for locking such that the back side grip part is capable of being unlocked without tilting with respect to the front side cover, therefore, when it is not used as a torque wrench, if it is locked such that the back side grip part does not tilt, it is possible to perform tightening operation other than a torque wrench. Further, if the back side grip part is locked, it is possible to prevent noise which may be caused when the back side grip part contacts the front side cover part or the like, thereby excellent usability can be obtained.

DESCRIPTION OF REFERENCE NUMERALS

Figure 1:
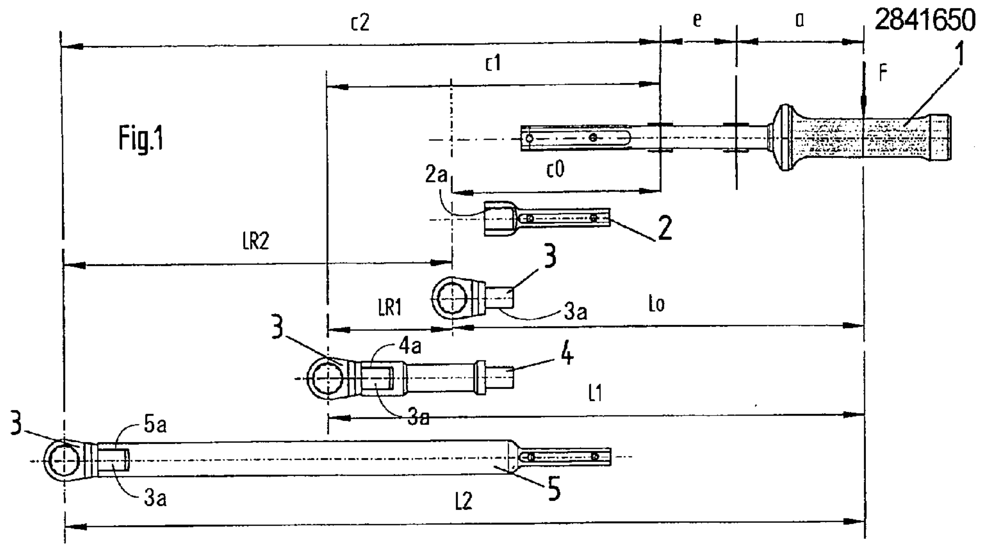
FIG. 1 is a diagram for illustrating an embodiment of the present invention, in which (a) and (b) are a front view and a side view of a torque wrench.

10 tightening unit
20 housing
21 front side cover part
22 back side grip part
23 lock member
231 long hole
α lock mechanism
30 strain body
40 distortion sensor
50 axis
60 tilt detector
70 setting unit
80 memory unit
100 microprocessor chip
110 torque computation unit
120 error monitoring unit
130 torque judgment unit
200 sensor unit
300 output unit

DETAILED DESCRIPTION OF THE PREFERRED EMBODIMENTS

Figure 2:
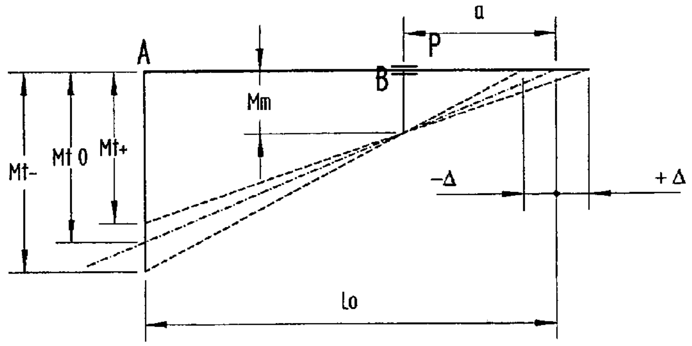
FIG. 2 is a sectional view taken along the line A-A in FIG. 1.
Figure 4:
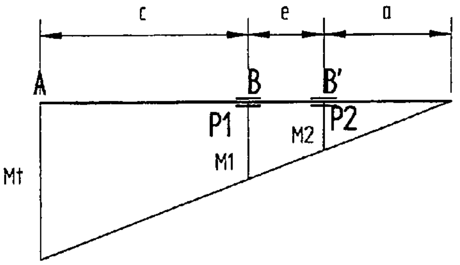
FIG. 4 is an exploded perspective view of a lock mechanism of the torque wrench.
Figure 3:
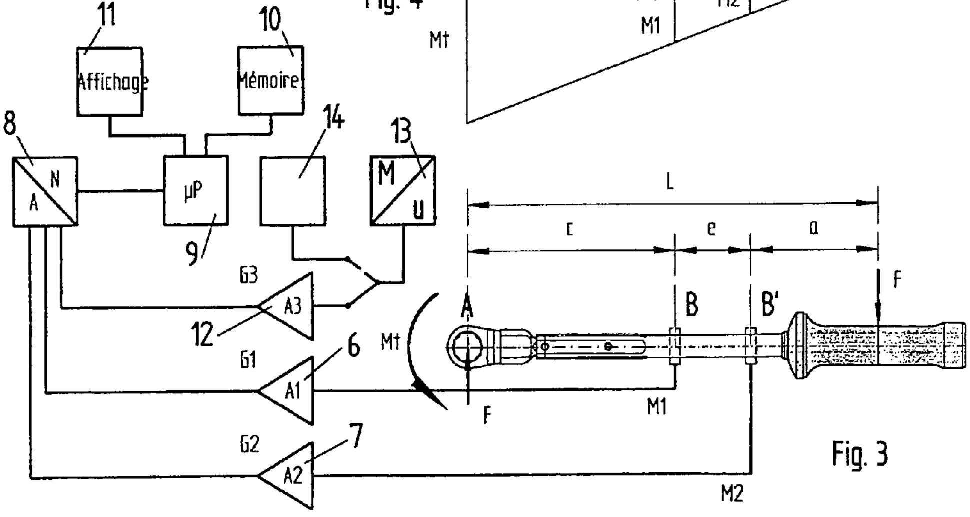
FIG. 3 is a schematic diagram showing the internal structure of the torque wrench, viewed from the front side.
Figure 4:
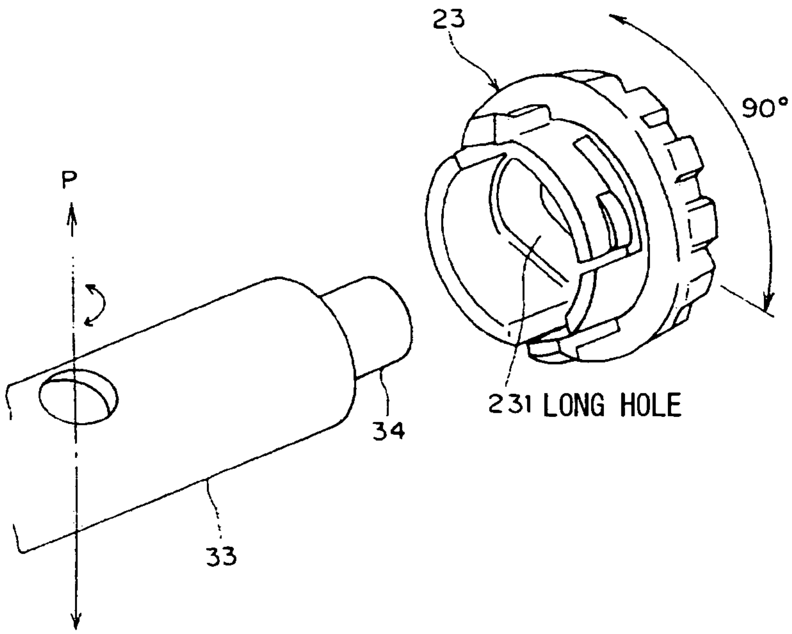
Figure 5:
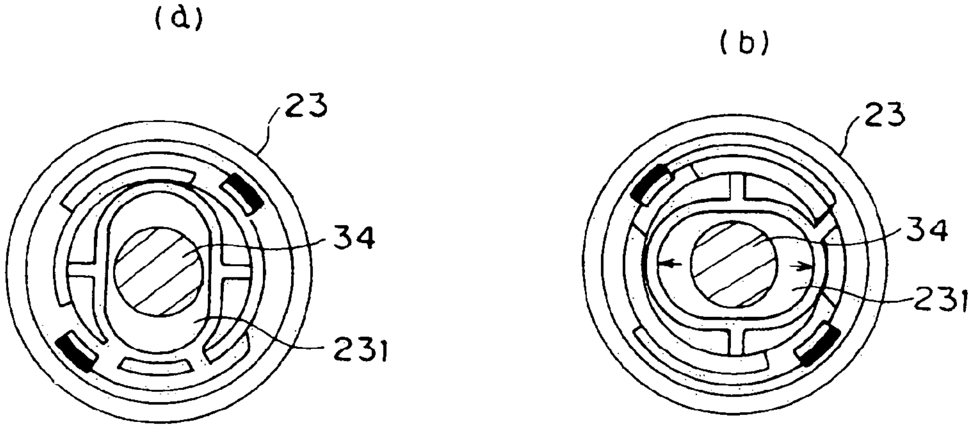
FIG. 5 is a rear view of a lock unit constituting the lock mechanism, in which (a) and (b) show a locked state and a free state.
Figure 6:
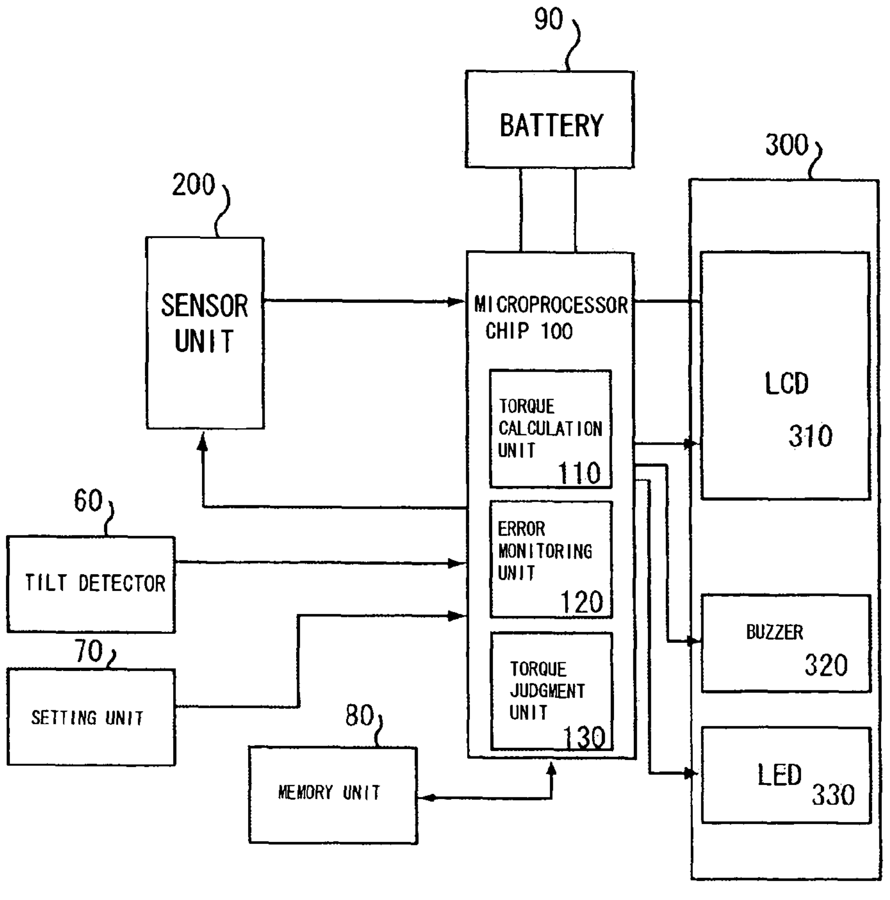
FIG. 6 is a diagram showing the electrical configuration of the torque wrench.
Figure 7:
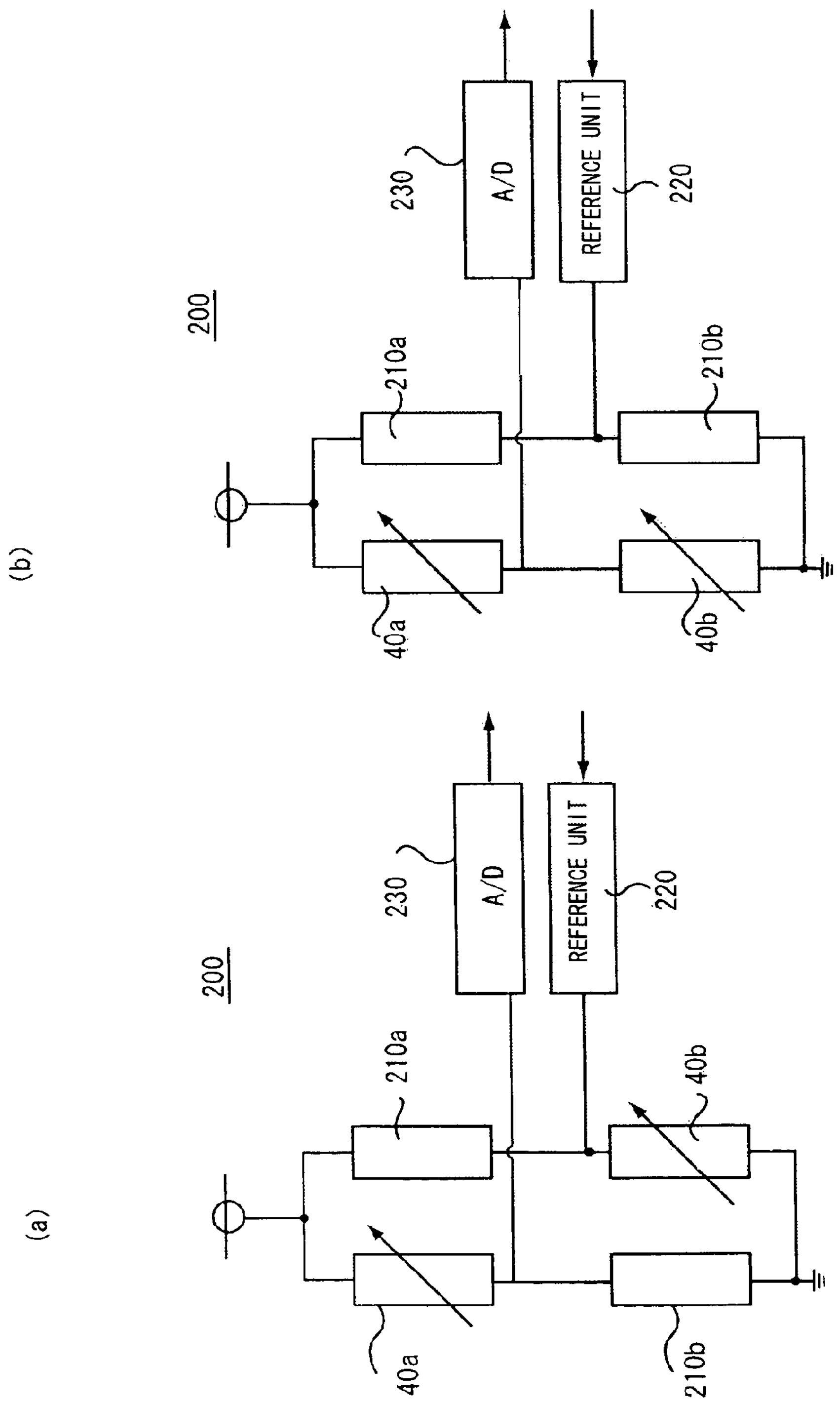
FIG. 7 is a circuit diagram of a sensor unit of the torque wrench, in which (a) and (b) show circuits used when a distortion sensor is mounted on one side and when distortion sensors are mounted on the both sides.
Figure 8:
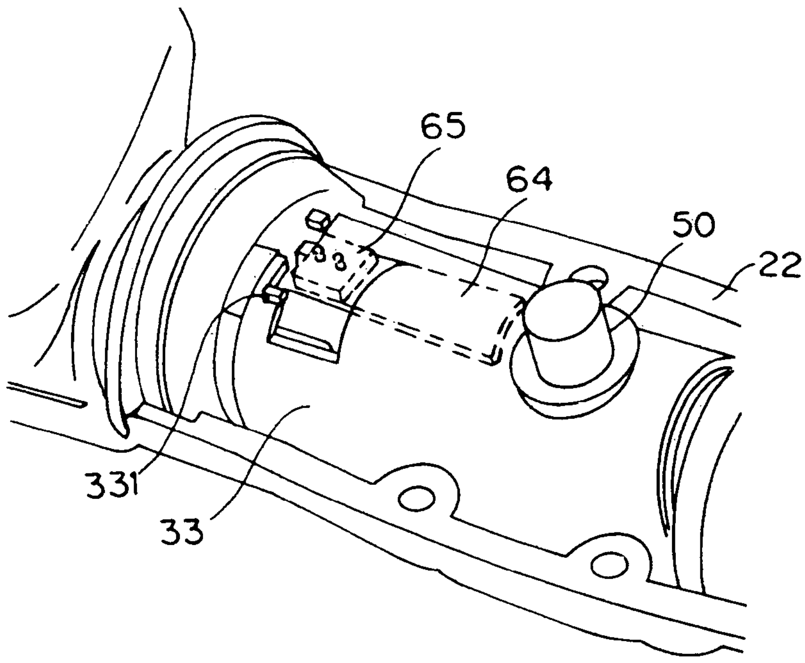
FIG. 8 is an illustration showing a modification of a tilt detector, which is a schematic diagram showing the internal configuration of a back side grip part of a torque wrench.
Figure 1:
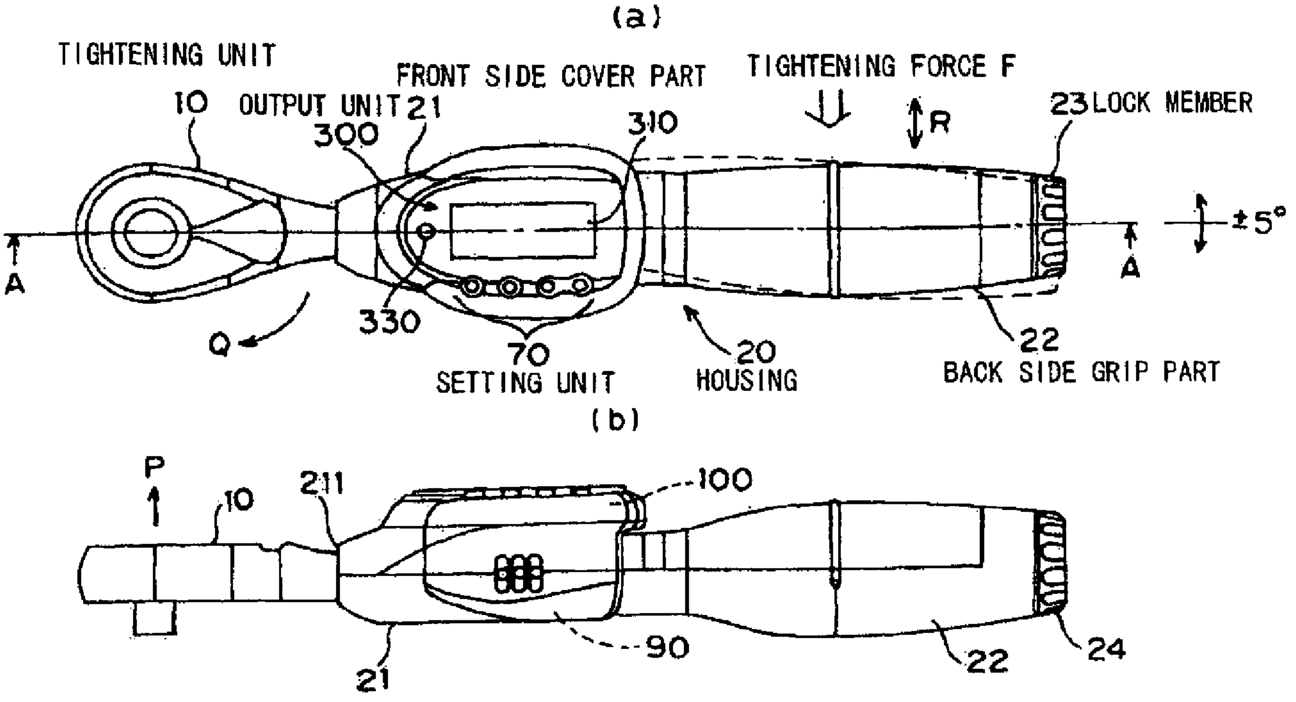
Figure 2:
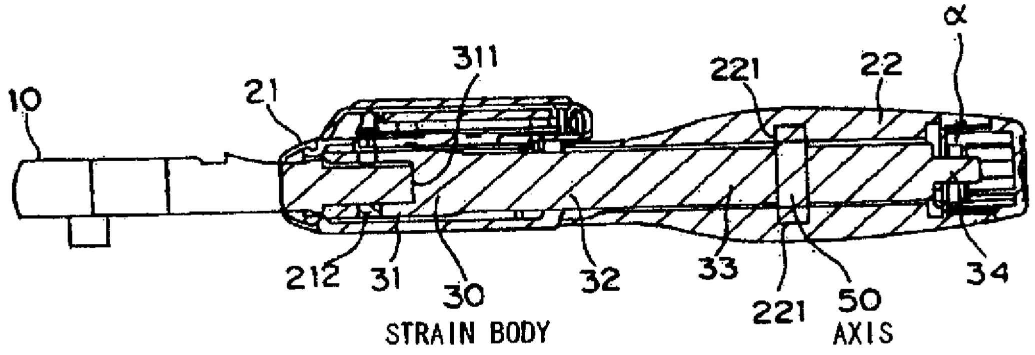
Figure 3:
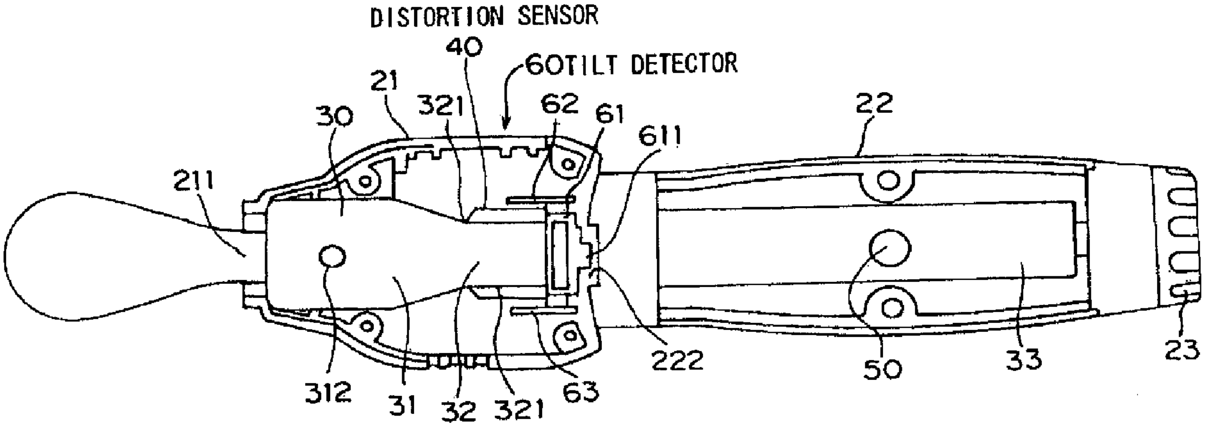
Figure 4:
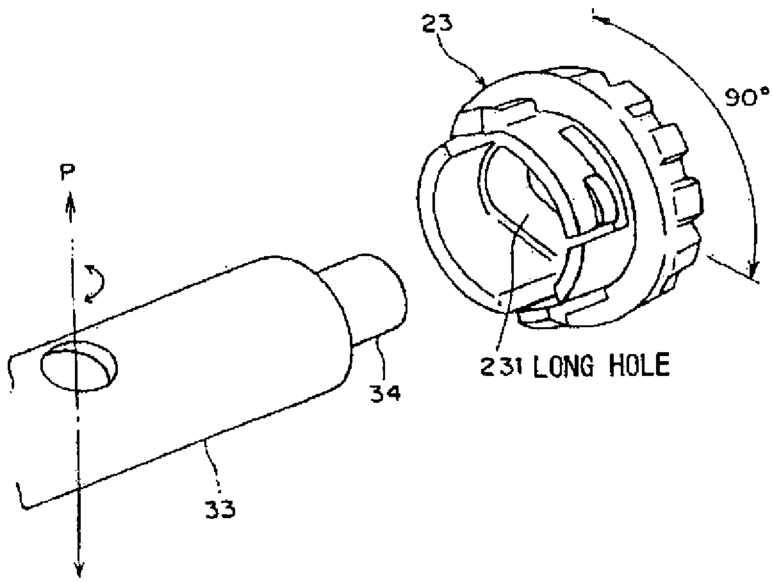
Figure 5:
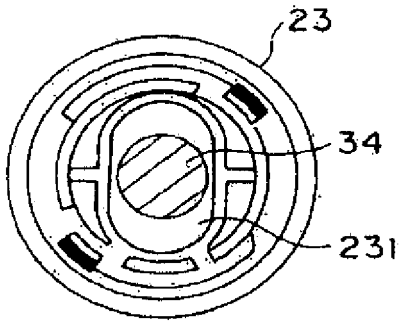
Figure 5:
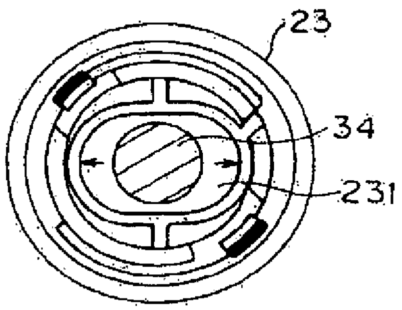
Figure 6:
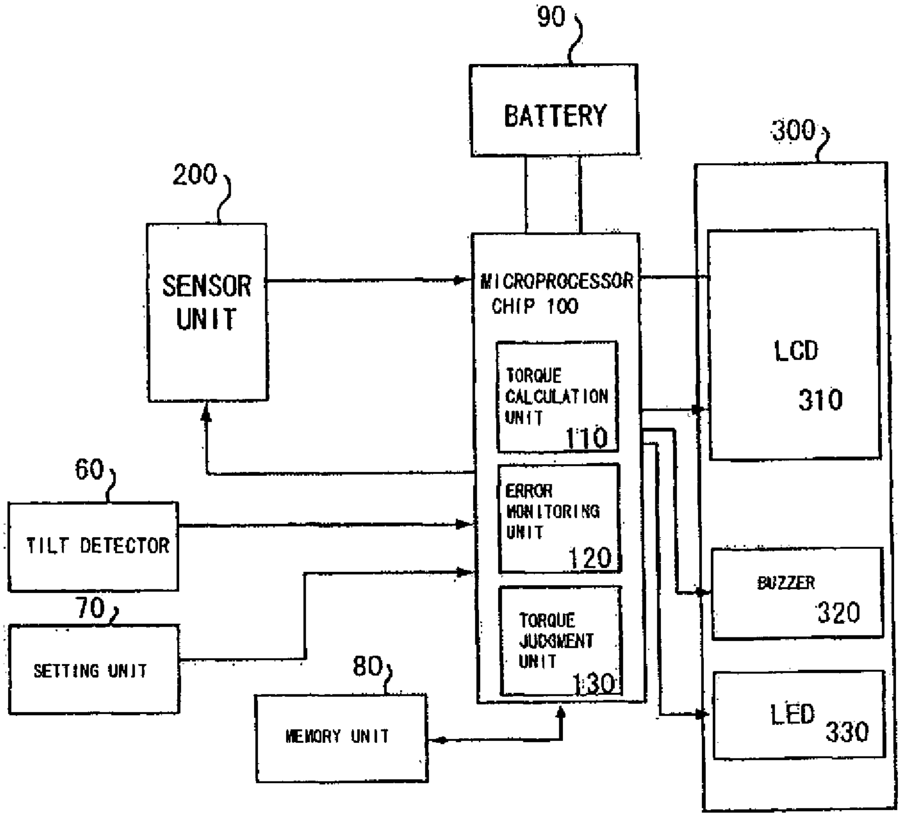
Figure 7:
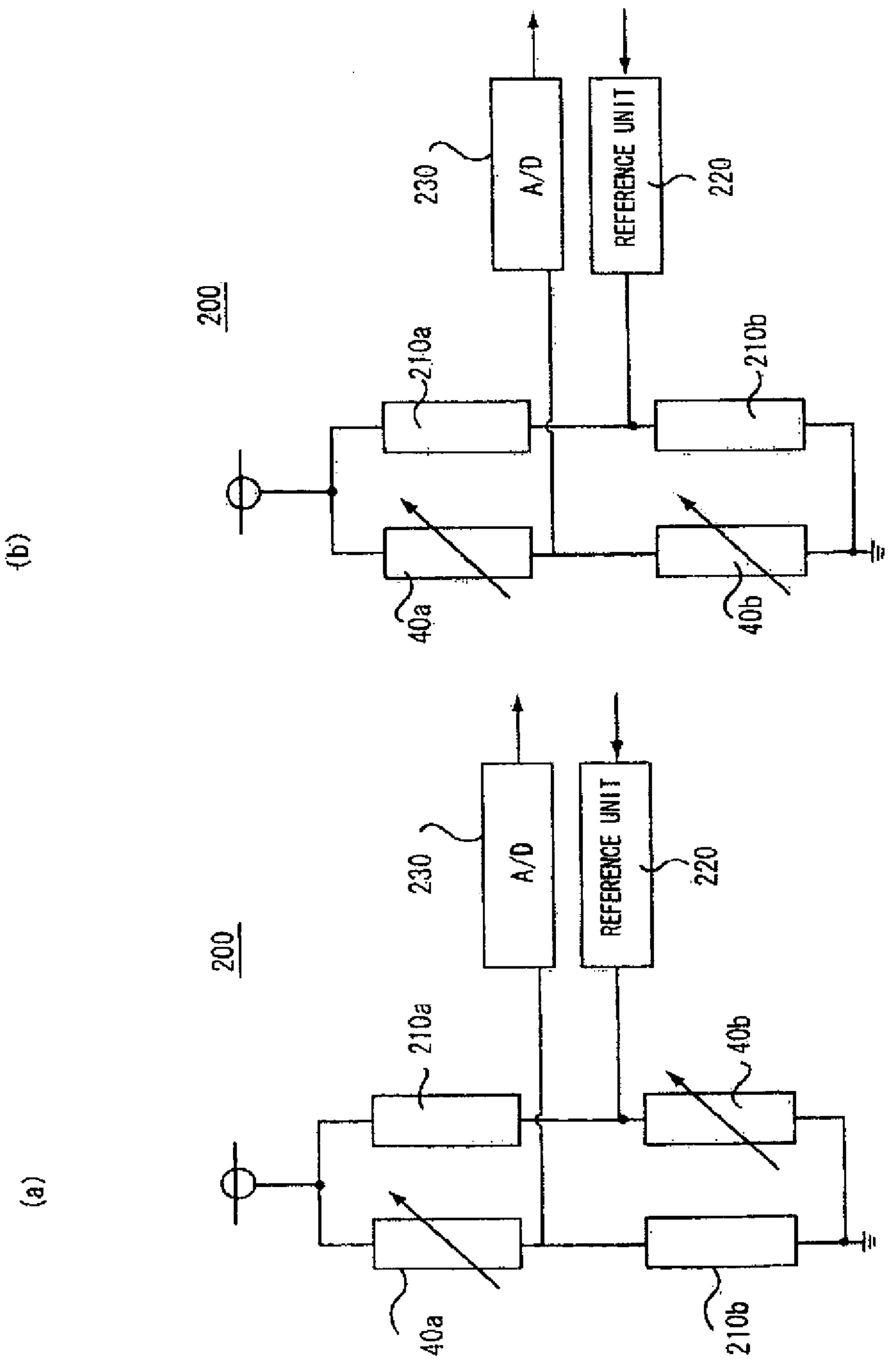
Figure 8:
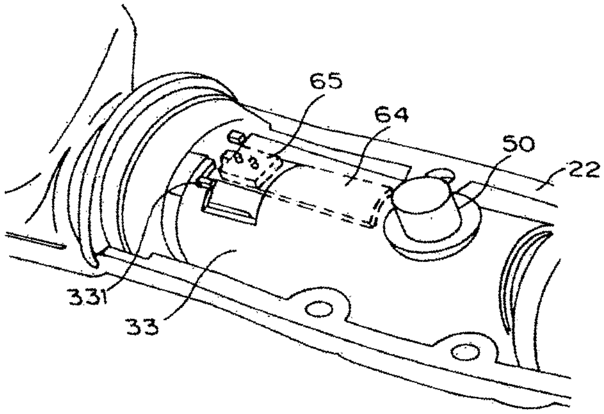

Hereinafter, an embodiment of the present invention will be explained with reference to FIGS. 1 to 8. FIG. 1 shows a front view and a side view of a torque wrench, FIG. 2 is a cross-sectional view taken along the line A-A in FIG. 1, FIG. 3 is a schematic diagram showing the internal structure of the torque wrench viewed from the front side, FIG. 4 is an exploded perspective view of a lock mechanism of the torque wrench, FIG. 5 is aback side view of a lock unit constituting the lock mechanism, FIG. 6 is an electrical block diagram of the torque wrench, FIG. 7 is a circuit diagram of a sensor unit of the torque wrench, and FIG. 8 is an illustration for showing a modification of a tilt detector, which is a schematic diagram showing the internal structure of a back side grip part of a torque wrench.

A torque wrench shown here is basically configured to include: a tightening unit 10 such as a ratchet; a housing 20 in a two-divided structure consisting of a front side cover part 21 and a back side grip part 22; a lock mechanism α provided to the housing 20; a strain body 30, accommodated inside the housing 20, in which a tightening unit 10 is connected replaceably with the tip part thereof; a distortion sensor 40, provided to the strain body 30, for detecting the distortion amount of the strain body 30 along with the tightening force of the tightening unit 10; a tilt detector 60, accommodated inside the housing 20, for detecting whether the back side grip 22 tilts ±5° with respect to the front side cover part 21 in tightening operation; a setting unit 70 for setting a tightening torque set value and the like; a microprocessor chip 100 having a function of computing a tightening torque based on the detection result of the distortion sensor 40; and an output unit 300 for outputting a tightening torque T and the like. First, the mechanical configuration of the torque wrench will be explained with reference to FIGS. 1 to 5.

Note that although the tightening unit 10 rotates in a Q direction by the tightening force F acted on the back side grip part 22 of the housing 20 as shown in FIG. 1, a direction on which the tightening force F is acted is indicated as R, and a rotational axial direction, orthogonal thereto, of the tightening unit 10 is indicated as P.

The tightening unit 10 is an axial member, and the tip part thereof is provided with a tightening tool in a P direction, and types of the tightening tools include ratchets, spanners, and monkey wrenches. In the example shown in the Figure, the tightening tool of the tightening unit 10 is a ratchet. In a state where the tightening unit 10 is mounted to the tip part of the front side cover part 21 of the housing 20, the effective length of a torque wrench is same irrespective of the type of the tightening tool.

The housing 20 is a resin molded article having a two-divided structure consisting of the front side cover part 21 and the back side grip part 22. The front side cover part 21 is a cylindrical body accommodating the tip part 31 and the intermediate part 32 of the strain body 30, and a hole 211, into which the base end part of the tightening unit 10 is inserted is formed in the tip face. On the other hand, the back side grip part 22 is a cylindrical body accommodating the base end part 33 of the strain body 30 with a margin, and an axis 50 extending in the P direction provided therein.

On the back side of the front side cover part 21, amounting screw 212 for fixing the tightening unit 10 to the strain body 30 is provided toward the P direction, and on the front side thereof, the output unit 300 and the setting unit 700 are provided. Inside the front side cover part 21, a battery 90 is accommodated detachably. Note that in the back sides of the output unit 300 and the setting unit 70, electronic components such as the microprocessor chip 100 are arranged.

On a face, in the P direction, of the tip part of the back side grip part 22, a rectangle notch 222 is formed extending in the R direction. The back end part of the back side grip part 22 is provided with a lock member 23 which is an almost disc-shaped resin molded article and is mounted rotatably. Inside the rock member 23, there is formed a long hole 231 for restricting movement, into which the back end part 34 of the strain body 30 is inserted.

Inside the front side cover part 21, there are provided an actuator 61 and tilt detecting switches 62 and 63 which are components of the tilt detector 60. At a position opposite to the notch 222 inside the front side cover part 21, an actuator 61 is provided movably in the R direction. The actuator 61 is a resin molded article having an almost recess-shaped cross-section with a contact piece 611, and is arranged over the intermediate part 32 of the strain body 30. The contact piece 611 of the actuator 61 is inserted in the notch 222 formed in the back side grip part 22, and is capable of contacting the both end faces of the notch 222. On faces opposite the both side faces of the strain body 30 of the inner wall of the front side cover part 21, the tilt detecting switches 62 and 63 are mounted at positions where they can contact the both end parts of the actuator 61 via sub boards, respectively. The detailed explanation of the tilt detector 60 will be described later.

The strain body 30 is a cylindrical, metallic long elastic body, having a slightly shorter length than the housing 20, and is accommodated inside the housing 20. The strain body 30 is so configured to include: the tip part 31 and the intermediate part 32 located inside the front side cover part 21; the base end part 33 located inside the back side grip part 22; and the back end part 34 located inside the lock member 23. The back end part 34 of the strain body 30 is an axis having a smaller diameter than those of the tip part 31, the intermediate part 32 and the base end part 33. Note that although the cylindrical strain body 30 is used in view of the processability and the cost in the present embodiment, it may be in a rectangular column or a cylindrical column. Since the strain body 30 is rotatably supported by the axis 50 and the elastic direction is constant, a rectangular column is optimum.

In the strain body 30, the tip part 31 thereof has a hole 311, formed in a longitudinal direction, into which the base end part of the tightening unit 10 is inserted, and a side face thereof has a screw hole 312, formed in a P direction, in which a mounting screw 212 is screwed. Thereby, the tightening unit 10 is connected with the tip part 31 of the strain body 30 replaceably.

In the intermediate part 32 of the strain body 30, a dent 321 is formed in either side face thereof in an R direction, respectively. Two distortion sensors 40 in total are fixed to one dent 321 (or both).

The base end part 33 of the strain body 30 has an axis 50, which is a boss, provided in a P direction. The both end parts of the axis 50 are rotatably supported in axial holes 221, each of which is formed in the inside wall of the back side grip part 22. That is, the strain body 30 is rotatably supported with the axis 50 such that the back side grip part 22 can tilt with respect to the front side cover part 21. In the present embodiment, the strain part has a free configuration in which the back side grip part 22 is able to be tilted at ±5° with respect to the front side cover part 21. When the back side grip part 22 is tilted at ±5° with respect to the front side cover part 21 at the time of performing tightening operation, the base end part 33 (or the back end part 34) of the strain body 30 partially contacts the inside wall of the back side grip part 22 (or the end face of the long hole 231). That is, when the tilt angle of the back side grip part 22 is less than ±5°, the power point with respect to the strain body 30 is just one point, or the axis 50, but when the tilt angle of the back side grip part 22 reaches ±5°, a plurality of power points exist with respect to the strain body 30.

The lock mechanism α is configured about the lock mechanism 23 mounted rotatably to the back end part of the back side grip part 22, and has a configuration of locking such that the back side grip part 22 is able to be unlocked without tilting with respect to the front side cover part 21. That is, with a rotational angle of the lock mechanism 23 in which the long hole 231 faces in a P direction, the back end part 34 of the strain body 30 is in a movement restricted state by the long hole 231 as shown in FIG. 5(*a*), as a result, the back side grip part 22 cannot tilt with respect to the front side cover part 21. In this manner, locking is performed such that the front side cover part 21 and the back side grip part 22 are kept in a linear state.

When the lock member 23 is rotated by 90° from this state, the back end part 34 of the strain body 30 is movable as the arrow shown along the long hole 231, as shown in FIG. 5(*b*), and along with it, the back side grip part 22 is able to tilt with respect to the front side cover part 21. In this way, by rotating the lock member 23 by 90° so as to turn back the rotation of 90°, the state is in a locked state or in an unlocked state (free state).

Next, the electrical configuration of the torque wrench will be explained with reference to FIGS. 6 and 7.

As for the distortion sensor 40, a distortion gauge in which the resistance changes linearly corresponding to the distortion amount of the strain body 30 is used in the present embodiment, and one side of the strain body 30 (one of the dents 321) is provided with two sensors in total. Therefore, the sensor unit 200 has a circuit configuration shown in FIG. 7(*a*).

The sensor unit 200 includes: distortion sensors 40*a* and 40*b* and the fixed resistance 210*a* and 210*b* which are bridge-connected; a reference unit 220 for generating the reference voltage and outputting it to a bridge circuit consisting of the distortion sensors 40*a* and 40*b* and the like; and an A/D converter 230 for converting an analogue value outputted from the bridge circuit as a voltage into a digital value, and the sensor unit 200 is configured to output an output value D of the A/D converter 230 to a microprocessor chip 100.

The reference voltage outputted from the reference unit 220 is controlled by the microprocessor chip 100 at the time of initial setting such that the output voltage D of the sensor unit 200 shows zero. Thereby, the output value D of the sensor unit 20 shows the size of the distortion amount, and shows the size of the tightening force F acted on the back side grip part 22.

Note that in a case where two distortion sensors 40 in total are mounted on both sides of the strain body 30 (both dents 321), a circuit configuration shown in FIG. 7(*b*) or the like is preferably used as the sensor unit 200.

The tilt detector 60 has an actuator 61 and tilt detecting switches 62 and 63 as mentioned above, the tilt detector 60 is so configured that when the tilt angle of the back side grip 22 becomes +5°, the actuator 61 moves to one direction and tilts, and the contact point output of the tilt detecting switch 63 is turned on, and when the tilt angle of the back side grip part 22 becomes −5° on the other hand, the actuator 61 moves in the opposite direction and the contact point output of the tilt detecting switch 62 is turned on. Detection signals of the tilt detecting switches 62 and 63 are outputted to the microprocessor chip 100.

In the setting unit 70, tightening torque set values and on/off of the power supply can be set and inputted. Such data is set to be outputted to the microprocessor chip 100. In the present embodiment, four press-button switches are used.

The output unit 300 includes: an LCD 310 which is a liquid crystal panel for displaying and outputting measured tightening torques T, measurement errors and the like; and a buzzer 320 and an LED 330 for notifying users of respective states such as the time when the power source is turned on or off, a state when measurement can be started, the time when the tightening torque T reaches 90% with respect to the torque set value, and at the time when the tightening torques T exceeds the tightening torque set value, in the present embodiment.

In the memory unit 80, a torque reference value R (=T0/D0, T0: tightening torque at reference weight, D0: output value of sensor unit 200 at reference weight) required for computing the tightening torque T is recorded in advance in the present embodiment, and the memory unit 80 is interconnected with a bus line of the microprocessor chip 100. In the present embodiment, an EEPROM which is a nonvolatile memory unit is used as the memory unit 80.

In particular, relating to the torque reference value R, a measurement is performed actually by assuming the reference weight is 500[N·m] for example, and the torque reference value R obtained at that time is recorded in the memory unit 80 in advance. Although the tightening unit 10 is replaceable to various types, an output generated in the distortion sensor 40 solely depends on the force applied to the axis 50, so only one kind of torque reference value R should be prepared.

The battery 90 supplies a power supply voltage not only to the microprocessor chip 100 but also to the sensor unit 200, the output unit 300 and the like. In the present embodiment, a manganese dioxide lithium battery is used.

In the microprocessor chip 100, input ports thereof are connected with the sensor unit 200, the tilt detecting switches 62 and 63, the setting unit 70 and the like, and output ports thereof are connected with the output unit 300 and the like, in the present embodiment. The microprocessor chip 100 is so configured that by processing software on the inside memory unit sequentially, functions as a torque computation unit 110, an error monitoring unit 120, and a torque judgment unit 130 described below and the like work.

The torque computation unit 110 computes the tightening torque T (=R×D) based on the torque reference value R on the memory unit 80 and on the output value D of the sensor unit 200, and outputs the computation result to the output unit 300 as a torque measurement value. This is the basic function of the microprocessor chip 100 as the torque computation unit 110. In the present embodiment, an instantaneous value of the tightening torque T calculated as described above is outputted to the LCD 310. As for the instantaneous value outputted to the LCD 310, the held value can be released by a switching operation through the setting unit 70. When a torque unit other than N·m is set through the setting unit 70, it is possible to output a value of the tightening torque T converted into the torque unit set, with the unit indication, to the LCD 310.

The error monitoring unit 120 is so configured that when the detection result of the tilt detector 60 indicates that the tilt angle of the back side grip part 22 reaches ±5°, it outputs a measurement error to the output unit 300. In the present embodiment, if the contact outputs of the tilt detecting switches 62 and 63 are turned on during the torque computation unit 110 working, the function as the torque computation unit 110 is stopped, and instead, the LCD 310 is set to display and output a prescribed time ERROR or the like. This is a function of the microprocessor chip 100 as the error monitoring unit 120.

The torque judgment unit 130 judges whether the tightening torque T shown by the calculation result of the torque computation unit 110 reaches 90% of the tightening torque set value set through the setting unit 70 and whether it exceeds the tightening torque set value, respectively, and outputs the judgment results through the buzzer 320 and the LED 330. This is a function of the microprocessor chip 100 as the torque judgment unit 130.

In addition to the functions described above, the microprocessor chip 100 includes a memory unit function for holding a tightening torque set value set through the setting unit 70 in the inner memory unit, and a sleep mode with which it is in a low power consumption state when a prescribed time change does not appear in the output value D of the sensor unit 200.

Hereinafter, a using method of the torque wrench configured as described above and its operation will be described.

First, when the power supply is turned on through the setting unit 70, a power supply voltage is supplied to the microprocessor chip 100 and the like so as to be in an operating state. The microprocessor chip 100 reads in characteristic values required for setting on the memory unit 80 to thereby perform processing of initial setting, including a zero point control, to the sensor unit 200.

In this state, when a tightening torque set value or a torque unit or the like is set and inputted through the setting unit 70, the microprocessor chip 100 saves it in the inner memory unit, and when a prescribed time change does not appear in the output value D of the sensor unit 200, it moves to the sleep mode, that is, a low power consumption state.

When a bolt or the like is tightened by using the torque wrench actually, the back side grip part 22 is held by a hand so as to rotate the tightening unit 10 in a Q direction. The grip position at this time is around the center of the back side grip part 22 such that the power point of the tightening force F with respect to the strain body 30 coincides with the axis 50. In other words, the torque wrench is set such that a normal torque measurement is performed only when tightening operation is performed at this correct grip position.

That is, when tightening operation is performed at the correct grip position, the whole strain body 30 is distorted as prescribed, corresponding to the tightening force F. Then, the microprocessor chip 100 computes the tightening torque T corresponding to the torque reference value R on the memory unit 80 and the output value D of the sensor unit 200 and the like, and outputs the computed value or the like to the LCD 310. On the LCD 310, the tightening torque T is displayed and outputted in a torque unit on the inner memory unit.

When the tightening torque T reaches 90% of the tightening torque set value on the inner memory unit, the fact it outputted through the buzzer 320 and the LED 330. Then, when the tightening torque T exceeds the tightening torque set value on the inner memory unit, the fact is outputted through the buzzer 320 and the LED 330. With the sound of the buzzer 320 and lighting of the LED 330, alarming is performed. Since the user performed tightening operation of a bolt and the like while checking the alarm, tightening operation can be proceeded smoothly.

On the other hand, when tightening operation is performed while the back end part of the back side grip 22, not the correct grip position, is held by hand, the point of action of the tightening force F with respect to the strain body 30 does not coincide with the axis 50, and when the tilt angle of the back side grip part 22 with respect to the front side cover 21 reaches ±5°, a plurality of power points exist with respect to the strain body 30, so the distorted state of the strain body 30 is not like a desired one. However, when the tilt angle of the back side grip part 22 with respect to the front side cover 21 reaches ±5°, contact outputs of the tilt detecting switches 62 and 63 are changed to be turned on, whereby computation of the tightening torque T is interrupted and ERROR or the like is displayed on and outputted to the LCD 310 by the microprocessor chip 100.

In this way, the tightening torque T is displayed on and outputted to the LCD 310 only when tightening operation is performed at the correct grip position. Consequently, accurate measurement of the tightening torque T is performed, which enables an inexperienced person to realize proper tightening operation.

If a tightening tool must be changed to another one, it can be done by removing a fixing screw 212 and replacing the tightening unit 10. Since the effective length does not change after replacement, it is possible to measure the tightening torque T as same way as that described above. This is also used for tightening operation using tools other than a ratchet such as a monkey wrench or a spanner, so its usage is large.

Note that if it is not used as a torque wrench, the lock member 23 should be rotated and locked such that the back side grip part 22 does not tilt with respect to the front side cover part 21. It is possible to perform tightening operation other than a torque wrench smoothly. Further, by locking the back side grip part 22 not only at the time of not using the torque wrench but also at the time of storing it, it is possible to prevent a noise which may be generated when the back side grip part 22 contacts the front side cover part 21 or the like, whereby the usability is improved.

In the case of the torque wrench as described above, when the effective length varies corresponding to ranges of the tightening torque T, accurate measurement results of the tightening torque T can be obtained by only rewriting data of the torque reference value R on the memory unit part 80. That is, manufacturers can commonly use components other than a tightening unit in providing various types of torque wrenches which are different in ranges of the tightening torque T. Thereby, the production cost can be suppressed significantly. Further, when tightening operation is performed by holding the back side grip part 22 by hand, the tightening force F acts on the strain body 30 solely through the axis 50, so the strain body 30 is distorted largely as desired. Therefore, it is possible to detect the tightening force F with high accuracy by the distortion sensor 40, whereby the measurement accuracy of the tightening torque T is improved.

The torque wrench according to the present invention is not limited to the above-described embodiment, and may be subject to a design change as described below. As for the tightening unit 10, any form, kind of tool, connecting method to the strain body 30 and the like are acceptable, and it may be in a mode where it is connected with the tip part 31 of the strain body 30 via the front side cover part 21. As for the strain body 30, any material, form and the like are acceptable, and it may be in a mode where the tip part 31 thereof is exposed. As for the distortion sensor 40, any mounting position, type and the like are acceptable, and it may be in a mode where it is provided on the inner wall of the housing 20.

The torque computation unit 110, the error monitoring unit 120 and the torque judgment unit 130 may be in modes realizing the same or similar functions by analog circuits or the like. In particular, the torque computation unit 110 may be in a mode that a plurality of torque reference values R corresponding to respective effective lengths are recorded in the memory unit 80 in advance while the type of tightening unit 10 can be inputted selectively through the setting unit 70, and a torque reference value R corresponding to the type of the tightening unit 10 inputted selectively is read out from the memory unit 80, and computation of the tightening torque T is performed by using the readout torque reference value R.

As for the output unit 300, any torque measurement value, measurement error and output format of a judgment result are acceptable, and it may being mode where a judgment result whether a torque measurement value is close to or reaches the torque set value is simply notified with light, sound, vibration or the like. The housing 20 may be formed of a material which can stand against expected shock, and any form may be accepted. It may be in a mode that the base end part 33 of the strain body 30 is held simply inside the back side grip part 22.

As for the tilt detector 60, any mounting position, detected tilt angle and kind are acceptable, and one in a mode shown in FIG. 8 may be used. That is, protruded pieces 331 and 331 are provided in line in R direction on a face of the base end part 33 of the strain body 30, on the other hand, a position detecting switch 65 for detecting approximately of the protruded pieces 331 and 331 is mounted on the inner wall of the back side grip part 22 via the sub board 64. In the embodiment shown in FIG. 8, it is set that the inner wall of the back side grip part 22 contacts the strain body 30, and contact point state of the position detecting switch 65 is turned on at a previous stage before a plurality of power points positions are generated with respect to the strain body 30. Specifically, when the tilt angle of the back side grip part 22 reaches ±4.5°, a contact point state of the position detecting switch 65 is set to be turned on.

As for the lock mechanism α, any mounting position and types and the like are acceptable, and it may be in a mode where the lock pin is inserted inside the back side grip part 22 to lock the strain body 30 so as not to move.

What is claimed is:

1. A torque wrench, comprising:

a tightening unit;

a housing;

an axis;

a strain body including a tip part for replaceably connecting the tightening unit thereto;

a setting unit for selectively inputting a type of the tightening unit thereto;

a distortion sensor for detecting a distorted amount of the strain body corresponding to a tightening force of the tightening unit;

a torque computation unit, in which a plurality of predetermined torque reference values required for computing tightening torques of different types of tightening units and corresponding to effective lengths of the tightening units have been prepared in advance, for computing the tightening torque T=(R×D) based on an appropriate one value R of the torque reference values that corresponds to the type of the tightening unit and a detection result D of the distortion sensor;

an output unit for outputting at least a computation result by the torque computation unit as a tightening torque measurement value; and a memory unit, externally connected to a device incorporating the torque computation unit, for storing therein the predetermined torque reference values for outputting to the computation unit, wherein said torque reference value R is determined by R=T0/D0, in which T0 is a tightening torque at a preset reference weight, and D0 is an output value of said distortion sensor at said preset reference weight;

wherein the housing includes:

a front side cover part in a cylindrical shape for accommodating the tip part of the strain body, a tip face thereof having a hole for inserting a base end part of the tightening unit; and a back side grip part in a cylindrical shape for accommodating a base end part of the strain body, wherein the axis is disposed inside the back side grip part and extends in a direction orthogonal to the tightening force of the tightening unit so as to pass through the strain body, and wherein the back side grip part is capable of tilting slightly with respect to the front side cover part with the axis rotatably supporting the back side grip part.

2. The torque wrench as claimed in claim 1, comprising:

a setting unit for setting a tightening torque set value; and a torque judgment unit for judging whether or not the torque measurement value shown by the computation result of the torque computation unit is close to/has reached the tightening torque set value as set through the setting unit, and causing the output unit to output the judgment result.

3. The torque wrench as claimed in claim 2, wherein the housing is provided with a lock mechanism for releasably locking the back side grip part to prevent tilting of the grip part with respect to the front side cover part.

4. The torque wrench as claimed in claim 3, wherein the lock mechanism is configured to include a lock member rotatably coupled to a back end part of the back side grip part, the lock member having a movement regulating long hole for inserting the back end part of the strain body thereinto.

5. A torque wrench, comprising:

a tightening unit:

a strain body including a tip part for replaceably connecting the tightening unit thereto;

a housing of a two-divided structure including:

a front side cover part in a cylindrical shape for accommodating the tip part of the strain body, a tip face thereof having a hole for inserting a base end part of the tightening unit; and a back side grip part in a cylindrical shape for accommodating a base end part of the strain body and having an axis, inside thereof, extending in a direction orthogonal to the tightening force of the tightening unit, the strain body being rotatably supported by the axis such that the back side grip part is capable of tilting slightly with respect to the front side cover part;

a setting unit for selectively inputting a type of the tightening unit thereto;

a distortion sensor for detecting a distorted amount of the strain body corresponding to a tightening force of the tightening unit;

a torque computation unit, in which a plurality of predetermined torque reference values required for computing tightening torques of different types of tightening units and corresponding to effective lengths of the tightening units have been prepared in advance, for computing the tightening torque T=(R×D) based on an appropriate one value R of the torque reference values that corresponds to the type of the tightening unit and a detection result D of the distortion sensor, wherein said torque reference value R is determined by R=T0/D0, in which T0 is a tightening torque at a present reference weight, and D0 is an output value of said distortion sensor at said present reference weight;

an output unit for outputting at least a computation result by the torque computation unit as a tightening torque measurement value;

a memory unit, externally connected to a device incorporating the torque computation unit, for storing therein the predetermined torque reference values for outputting to the computation unit;

a tilt detector, provided inside the housing, for detecting whether the back side grip part is tilted at a predetermined angle with respect to the front side cover part in tightening operation; and an error monitoring unit for causing the output unit to output a measurement error based on a detection result of the tilt detector.

6. The torque wrench as claimed in claim 5, comprising:

a setting unit for setting a tightening torque set value; and a torque judgment unit for judging whether or not the torque measurement value shown by the computation result of the torque computation unit is close to/has reached the tightening torque set value as set through the setting unit, and causing the output unit to output the judgment result.

7. The torque wrench as claimed in claim 6, wherein the housing is provided with a lock mechanism for releasably locking the back side grip part to prevent tilting of the grip part with respect to the front side cover part.

8. The torque wrench as claimed in claim 7, wherein the lock mechanism is configured to include a lock member rotatably coupled to a back end part of the back side grip part, the lock member having a movement regulating long hole for inserting the back end part of the strain body thereinto.

9. The torque wrench as claimed in claim 5, wherein the housing is provided with a lock mechanism for releasably locking the back side grip part to prevent tilting of the grip part with respect to the front side cover part.

10. The torque wrench as claimed in claim 9, wherein the lock mechanism is configured to include a lock member rotatably coupled to a back end part of the back side grip part, the lock member having a movement regulating long hole for inserting the back end part of the strain body thereinto.

11. A torque wrench, comprising:

a tightening unit;

a strain body including a tip part for replaceably connecting the tightening unit thereto;

a housing;

a setting unit for selectively inputting a type of the tightening unit thereto;

a distortion sensor for detecting a distorted amount of the strain body corresponding to a tightening force of the tightening unit;

a torque computation unit, in which a plurality of predetermined torque reference values required for computing tightening torques of different types of tightening units and corresponding to effective lengths of the tightening units have been prepared in advance, for computing the tightening torque T=(R×D) based on an appropriate one value R of the torque reference values that corresponds to the type of the tightening unit and a detection result D of the distortion sensor;

an output unit for outputting at least a computation result by the torque computation unit as a tightening torque measurement value; and a memory unit, externally connected to a device incorporating the torque computation unit, for storing therein the predetermined torque reference values for outputting to the computation unit, wherein said torque reference value R is determined by R=T0/D0, in which T0 is a tightening torque at a present reference weight, and D0 is an output value of said distortion sensor at said present reference weight, wherein the strain body is accommodated in the housing, wherein the housing has a two-divided structure including:

a front side cover part in a cylindrical shape for accommodating the tip part of the strain body, a tip face thereof having a hole for inserting a base end part of the tightening unit; and a back side grip part in a cylindrical shape for accommodating a base end part of the strain body and having an axis, inside thereof, extending in a direction orthogonal to the tightening force of the tightening unit, the strain body rotatably supported by the axis such that the back side grip part is capable of tilting slightly with respect to the front side cover part, wherein the housing is provided with a lock mechanism for releasably locking the back side grip part to prevent tilting of the grip part with respect to the front side cover part.

12. The torque wrench as claimed in claim 11, wherein the lock mechanism is configured to include a lock member rotatably coupled to a back end part of the back side grip part, the lock member having a movement regulating long hole for inserting the back end part of the strain body thereinto.

13. A torque wrench, comprising:

a tightening unit;

a housing;

a strain body including a tip part for replaceably connecting the tightening unit thereto;

a setting unit for selectively inputting a type of the tightening unit thereto:

a distortion sensor for detecting a distorted amount of the strain body corresponding to a tightening force of the tightening unit;

a torque computation unit, in which a plurality of predetermined torque reference values required for computing tightening torques of different types of tightening units and corresponding to effective lengths of the tightening units have been prepared in advance, for computing the tightening torque based on an appropriate value of the torque reference values that corresponds to the type of the tightening unit and a detection result of the distortion sensor; and an output unit for outputting at least a computation result by the torque computation unit as a tightening torque measurement value, wherein the housing has a two-divided structure including:

a front side cover part in a cylindrical shape for accommodating the tip part of the strain body, a tip face thereof having a hole for inserting a base end part of the tightening unit; and a back side grip part in a cylindrical shape for accommodating a base end part of the strain body and having an axis, inside thereof, extending in a direction orthogonal to the tightening force of the tightening unit, wherein the strain body rotatably supported by the axis such that the back side grip part is capable of tilting slightly with respect to the front side cover part, wherein the torque wrench further comprises:

a tilt detector, provided inside the housing, for detecting whether the back side grip part is tilted at a predetermined angle with respect to the front side cover part in tightening operation; and an error monitoring unit for causing the output unit to output a measurement error based on a detection result of the tilt detector.

14. A torque wrench comprising:

a tightening unit;

a housing;

an axis;

a strain body including a tip part for replaceably connecting the tightening unit thereto;

a setting unit for selectively inputting a type of the tightening unit thereto;

a distortion sensor for detecting a distorted amount of the strain body corresponding to a tightening force of the tightening unit;

a torque computation unit, in which a plurality of torque reference values required for computing tightening torques of different types of tightening units and corresponding to effective lengths of the tightening units have been prepared in advance, for computing the tightening torque based on an appropriate value of the torque reference values that corresponds to the type of the tightening unit and a detection result of the distortion sensor; and an output unit for outputting at least a computation result by the torque computation unit as a tightening torque measurement value, wherein the housing includes:

a front side cover part in a cylindrical shape for accommodating the tip part of the strain body, a tip face thereof having a hole for inserting a base end part of the tightening unit; and a back side grip part in a cylindrical shape for accommodating a base end part of the strain body, wherein the axis is disposed inside the back side grip part and extends in a direction orthogonal to the tightening force of the tightening unit so as to pass through the strain body, and wherein the back side grip part is capable of tilting slightly with respect to the front side cover part with the axis rotatably supporting the back side grip part.

* * * * *

UNITED STATES PATENT AND TRADEMARK OFFICE

CERTIFICATE OF CORRECTION

PATENT NO. : 7,832,286 B2
APPLICATION NO. : 11/327495
DATED : November 16, 2010
INVENTOR(S) : Takamichi Nakagawa et al.

It is certified that error appears in the above-identified patent and that said Letters Patent is hereby corrected as shown below:

Delete the title page and substitute therefore the attached title page consisting of the corrected illustrative figure and number of drawing sheets in patent.

Delete Drawing Sheets 1-6 and substitute therefore the attached Drawing Sheets 1-8 displaying the correct FIGS. 1-8.

Signed and Sealed this
Twelfth Day of July, 2011

David J. Kappos
*Director of the United States Patent and Trademark Office*

(12) United States Patent
Nakagawa et al.

(10) Patent No.: US 7,832,286 B2
(45) Date of Patent: Nov. 16, 2010

(54) TORQUE WRENCH

(75) Inventors: Takamichi Nakagawa, Hirakata (JP); Shogo Nakata, Kyoto (JP); Masahiko Umekawa, Kashiba (JP); Tadashi Hanai, Iga (JP); Kouji Fujita, Yao (JP)

(73) Assignees: Kyoto Tool Co., Ltd., Kyoto-shi (JP); Hosiden Corporation, Yao-shi (JP)

(*) Notice: Subject to any disclaimer, the term of this patent is extended or adjusted under 35 U.S.C. 154(b) by 0 days.

(21) Appl. No.: 11/327,495

(22) Filed: Jan. 9, 2006

(65) Prior Publication Data

US 2006/0225519 A1 Oct. 12, 2006

(30) Foreign Application Priority Data

Apr. 7, 2005 (JP) ............................ 2005-111035

(51) Int. Cl.
*G01L 5/24* (2006.01)

(52) U.S. Cl. .................................................. 73/862.22

(58) Field of Classification Search ............. 73/862.22, 73/862.21, 862.23, 862.26
See application file for complete search history.

(56) References Cited

U.S. PATENT DOCUMENTS 2,795,131 A * 6/1957 Booth ........................ 73/862.21
3,270,594 A * 9/1966 Grabovac .................... 81/483
3,274,827 A * 9/1966 Sturtevant .................. 73/862.23
4,558,601 A * 12/1985 Stasiek et al. ........... 73/862.23
4,602,538 A * 7/1986 Neuhaus ...................... 81/467
4,608,872 A * 9/1986 Mayer et al. ............ 73/862.23
4,665,756 A * 5/1987 Snyder ..................... 73/862.21
4,982,612 A * 1/1991 Rittmann .................. 73/862.23
6,698,298 B2 * 3/2004 Tsuji et al. ............. 73/862.21
6,784,799 B2 * 8/2004 Hsien ........................ 340/668
6,940,417 B2 * 9/2005 Hsien ........................ 340/668
7,036,407 B2 * 5/2006 Pyre et al. ................ 81/467
7,089,834 B2 * 8/2006 Reynertson et al ......... 81/479

FOREIGN PATENT DOCUMENTS

DE 20108689 U1 8/2001

(Continued)

OTHER PUBLICATIONS

Japanese Office Action dated Jul. 7, 2007 (in Japanese).
European Search Report dated Mar. 10, 2010.

*Primary Examiner*—Lisa M Caputo
*Assistant Examiner*—Octavia Davis
(74) *Attorney, Agent, or Firm*—Kratz, Quintos & Hanson, LLP

(57) ABSTRACT

The invention seek to enable to share main components other than a tightening unit even in use for different effective lengths corresponding to ranges of tightening torques. There are provided: a tightening unit 10 such as a ratchet, a housing 20 having a two-divided structure including a front side cover part 21 and a back side grip part 22; a strain body 30 provided inside the housing 20 and replaceably coupling the tightening unit 10 thereto; a distortion sensor 40, provided to the strain body 30, for detecting the distorted amount of the strain body 30 due to the tightening force of the tightening unit 10; a microprocessor chip 100 having functions including computing the tightening torque of the tightening unit 10 based on torque reference values prepared in advance and detection results of the distortion sensor 40; and an output unit 300 for outputting such as the tightening torque.

14 Claims, 8 Drawing Sheets

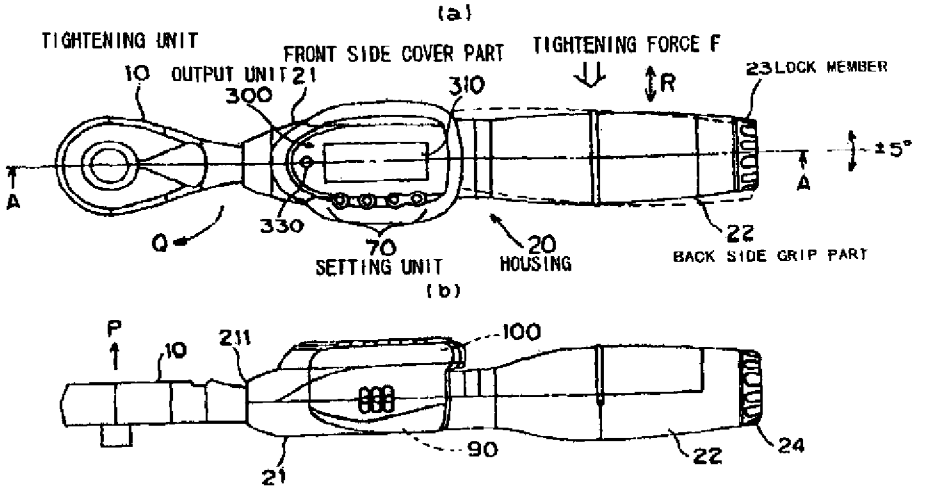

(a)

(b)